May 27, 1958 G. ARNOLD 2,836,444
STRUCTURAL POST-ATTACHMENT MECHANISM
Filed Oct. 4, 1954
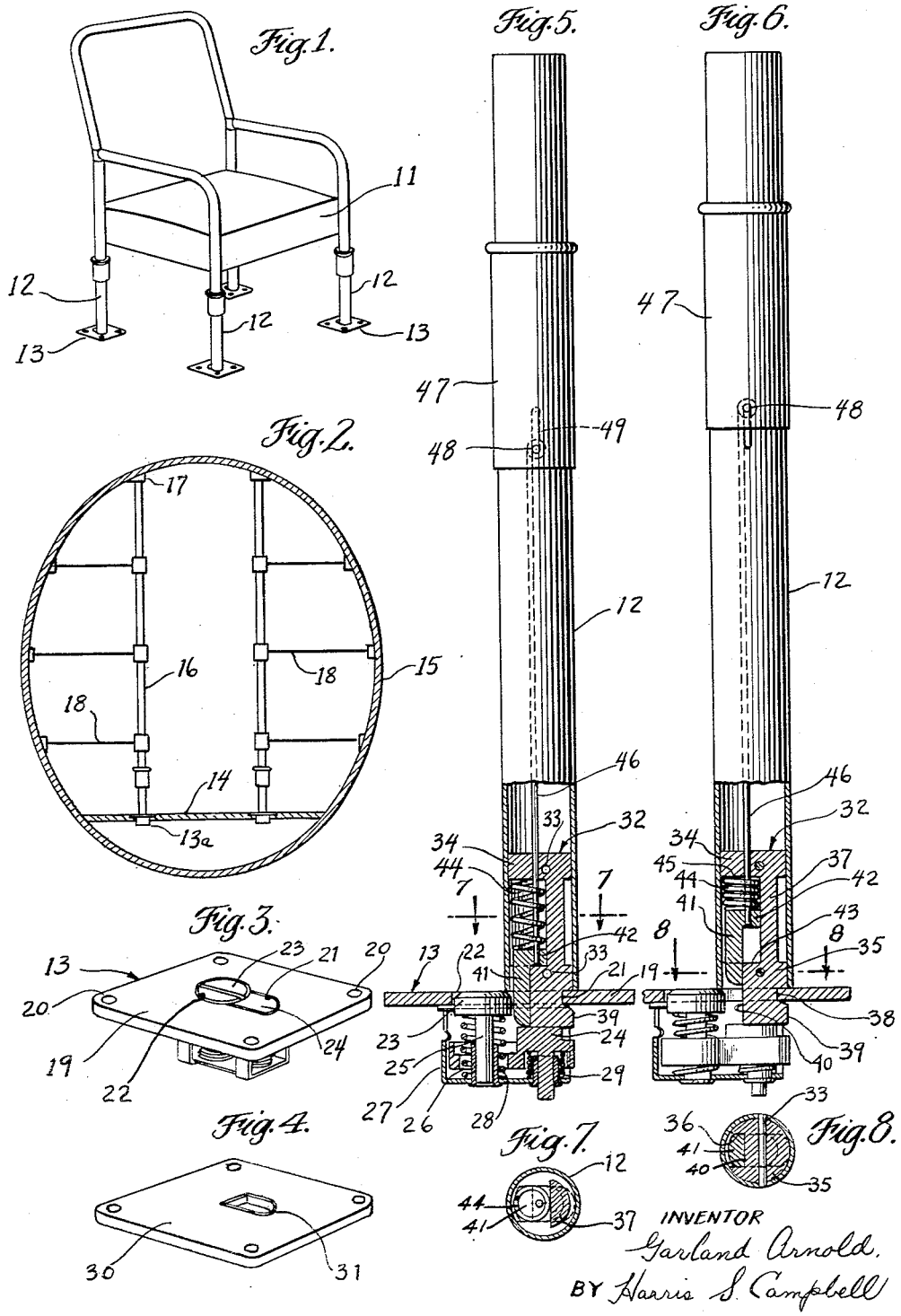
INVENTOR
Garland Arnold.
BY Harris S. Campbell
ATTORNEY

United States Patent Office 2,836,444
Patented May 27, 1958

2,836,444

STRUCTURAL POST-ATTACHMENT MECHANISM

Garland Arnold, Warrington, Pa., assignor to Eastern Rotorcraft Corporation, Doylestown, Pa., a corporation of Pennsylvania Application October 4, 1954, Serial No. 459,923

3 Claims. (Cl. 287—20.5)

This invention relates to structural supports or columns of the type which may be readily attached to or detached from an anchor support.

In some supports such as legs of removable seats or temporary column members, it is desirable that a construction which permits rapid attachment or detachment be used. For example, in a transport aircraft cabin it may be desirable to change the arrangement from one in which passenger seats are secured in position to an arrangement for some other purpose such as carrying litter patients. For the latter purpose special supporting posts are needed.

In order to provide a system which may be readily changed to give different structural arrangements of this nature the present invention has as one of its objects the provision of a structural supporting member constructed for attachment to a special connecting fitting which may be mounted in the floor or wall of a vehicle. This object includes the provision of a relatively simple connecting mechanism which may be rapidly engaged with or disengaged from the supporting fitting, thereby permitting rapid rearrangement of the supporting system for a different purpose.

A more specific object of the invention is the provision of a tubular supporting member having a terminal latch structure adapted to engage in a slotted fitting with mechanism for remote control of the latch to permit its manual release from the fitting.

A further object of the invention is the construction of a latch mechanism which may be attached either to an existing type of anchoring fitting or to a special simplified fitting. In addition this object includes the use of a special shape to the latch parts to provide reliable transfer of loads between the support and the anchoring fitting and at the same time to provide guided removal action when the mechanism is released.

How the foregoing and other objects and advantages of the invention are obtained will be evident from the following description of the drawings in which—

Figure 1 is a perspective view showing a chair having supporting legs provided with attachment mechanism according to the present invention.

Figure 2 is a somewhat diagrammatic sectional view of an aircraft fuselage illustrating a structural arrangement of supporting columns having the connecting mechanism of the present invention incorporated therein.

Figure 3 is a perspective view on an enlarged scale of a supporting fitting to which structural members may be attached.

Figure 4 is a perspective view of an attachment fitting having a different construction from that shown in Figure 3.

Figure 5 is a view, partly in section, showing the latch mechanism attached to the end of a structural member and secured to an anchor fitting.

Figure 6 is a view similar to Figure 5 showing the latch parts in released position.

Figure 7 is a sectional view through the latch mechanism taken in the direction of arrows 7—7 in Figure 5.

Figure 8 is a sectional view through the latch parts taken in the direction of arrows 8—8, Figure 6.

Referring to the figures, it will be seen that a chair 11 incorporates tubular legs 12, which are fastened securely to the floor by means of fittings 13. The fittings 13 are spaced properly to engage each of the legs 12.

In Figure 2 the floor of an aircraft is indicated at 14 as supported on a fuselage wall 15. The arrangement shown provides for the support of a series of litters used for such purposes as the transporting of wounded military personnel. Vertical supporting members 16 are shown in position with their upper ends engaged in sockets 17 and the lower ends held in position by floor fittings 13a. The upright members 16 support diaphragms or shelves 18, which may be used in the support of litters.

Figure 3 shows one form of anchor fitting which may be used with the latch mechanism of the present invention. The fitting 13 incorporates a plate member 19 which is preferably arranged with its surface flush with the floor and held in position by means of bolts or other suitable fastening which pass through holes 20 provided in the plate 19. These fittings are also illustrated in Figures 5 and 6. It will be seen that the plate 19 incorporates a keyhole type of slot having a narrow portion 21 and an enlarged circular opening 22. The latch opening 22 is provided with a closure member 23 while the reduced portion 21 of the opening is closed by means of a second member 24. As will best be seen from Figure 5, the closure 23 incorporates a shank 25 which extends downwardly to a guide 26 supported in a frame 27. A spring 28 urges the closure 23 to the closed position. Likewise a spring 29 urges the closure 24 to the upward or closed position where it is flush with the surface of plate 19. The detailed construction of this type of fitting is not a part of the present invention per se since it is disclosed in my copending application, Serial No. 291,819, filed June 4, 1952, now Patent No. 2,786,428, dated March 26, 1957.

Figure 4 illustrates a simplified form of fitting incorporating a plate 30 having a central aperture 31 shaped to accommodate the quick-release latch of the present invention. It will be noted that the aperture 31 corresponds closely in shape to the small portion of the aperture 21 shown in Figure 3. The aperture 31 incorporates a generally curved shape at one end and a flat surface at the other.

Referring to Figures 5 to 8 inclusive, it will be seen that the structural member 12 incorporates a latch device adapted to engage the aperture of a fitting such as illustrated in Figure 3 or Figure 4. At the lower end of tube 12 there is a supporting fixed member 32 which is retained in place in the tube 12 by pins 33. At the upper end of the fixed part 32, a cylindrical section 34 fits inside the tubular member 12. The lower end of fitting 32 is also circular in shape as indicated in Figure 8 except that a section 35 incorporates a groove 36. Connecting the upper portion 34 and the lower portion 35 is a portion 37 which is semi-circular in cross section as shown in Figure 7. A portion of the fixed fitting 32 projects beyond the end of tube 12 and is shaped as shown with a groove 38 which serves to form a projecting toe 39.

At the heel portion of the fitting member 32 there is a flat surface 40 against which the surface of a movable latch element 41 engages. The latch element 41 includes a projection 42 at its upper end which serves to engage a shoulder 43 of the fixed part 32 as shown in Figure 5. A compression spring 44 is mounted to react between the upper surface of the movable latch 41 and an upper shoulder 45 of the fixed part 32.

Attached to the movable latch part 41 is a flexible wire or rod 46 which extends upwardly through the inside of the structural tube 12. At a convenient location on the tube 12 there is provided an external sleeve member 47. A pin 48 extends through the sleeve member 47 and through slots 49 in the tube 12. The connecting rod 46 is attached to the cross pin 48. The slots 49 provide for limited axial movement of the sleeve 47 with respect to the tube 12, thereby providing a means for control of the movable latch member 41.

In Figure 5 the latch parts are shown in locked position in the floor fitting 13. In this position the toe 39 of the fixed portion 32 of the latch is held underneath the plate 19 by the movable heel member 41. Thus the member 41 fills up the remainder of the slot portion 21 of the aperture and reacts against the closure button 23 which is in the upper flush position. In this position the structural member 12 is retained against vertical dislodgment or against transverse movement. To place the member 12 in position in the fitting 13, it may be brought against the closure button 23 and with downward pressure the closing parts 23 and 24 are depressed and thus allow the latch member 32 to be moved horizontally into position where the toe 39 engages the under side of plate 19. In this position the movable closure part 24 is held down by the latch but the circular button part 23 is released and returns to the closed position shown in Figure 5.

When the type of plate shown in Figure 4 is used insertion of the latch through the aperture 31 is accomplished by positioning the toe portion of the latch so that it will enter through the aperture 31. Downward pressure forces the movable part 41 of the latch to move upwardly to permit entry of the toe portion 39. After passing through the slot the toe 39 is moved forward so that it lies underneath the plate 30. When in this location the movable portion 41 returns to latched position and fills up the rear portion of the aperture where it engages the flattened end of the aperture and thus prevents removal of the structure 12 until the latch is released.

Figure 6 illustrates the movable portion 41 of the latch in its released position. In this position the sleeve 47 is lifted so that the pin 48 engages the top of slot 49. This carries the latch 41 to retracted position slightly above the level of plate 19. This provides space behind the heel of the latch part 32 thus permitting the structural member 12 to be moved to allow the toe 39 to be lifted through the aperture. The upper portion of toe 39 is preferably formed with a sloping surface as illustrated, thereby serving to guide the terminal to release position when the latch 41 is retracted.

While the examples show attachment of structural members to a floor it will be obvious that this connecting mechanism may be used to retain structure supported on a wall such as temporary shelf brackets or the like.

From the foregoing it will be evident that I have provided an improved form of structural attachment mechanism which is of particular value for such purposes as changing the arrangement of an aircraft cabin from one in which seats are used to one in which other structural members are required. The latch mechanism of the present invention is adapted to engage either in existing fittings used for attachment of tie down rings or the like, or in special fittings provided for the structural latch. The shape of the terminal of the latch permits it to be used with the type of floor fitting having a keyhole form of slot or one having a simple aperture shaped to fit the projecting portion of the latch. The latch may be quickly engaged in the floor fitting and provides a secure connection which prevents movement of the structure in any direction. By the use of an external sleeve with the flexible rod attachment to operate the release latch member a convenient and quick-acting release is provided. The upward direction of pull on the sleeve provides a natural force in the direction required to pull the terminal from the latch plate and this removal is facilitated by the sloping shape of the engaging toe. The release is readily adaptable to a supporting tubular member which incorporates a curved portion between the terminal and the sleeve. This curved shape may be desirable in some configurations of seats.

I claim:

1. The combination of a slotted fitting and a detachable support, said fitting having a slot of generally keyhole shape, a flush spring-loaded plug to fit the enlarged portion of the slot, said support being in the form of a tubular member and including a latch structure to engage said slot, said latch structure having a part with a projecting toe portion rigidly attached to said support and having a flattened heel surface, a movable latch plate mounted adjacent said heel surface, said latch part and plate being proportioned to enter the reduced part of the keyhole slot by depressing said spring-loaded plug and being held in the reduced portion of said slot with the toe portion engaging said fitting when said plug returns to flush position, said latch plate being movable to allow release of the support from the fitting with the plug in flush position.

2. A construction in accordance with claim 1 in which the latch plate is movable by a manually operable element in the form of a sleeve around said tubular member.

3. A construction in accordance with claim 1 in which the latch plate is movable by a manually operable element in the form of a sleeve around said tubular member and is operatively connected to the manually operable element by a relatively flexible tension member.

References Cited in the file of this patent

UNITED STATES PATENTS

| 2,408,547 | Bertschinger | Oct. 1, 1946 |
| 2,422,693 | McArthur | June 24, 1947 |
| 2,427,681 | Lombard | Sept. 23, 1947 |
| 2,448,817 | McArthur | Sept. 7, 1948 |
| 2,464,543 | Modrey | Mar. 15, 1949 |
| 2,676,822 | Modrey | Apr. 27, 1954 |
| 2,730,687 | Modrey | Jan. 10, 1956 |
| 2,739,292 | Modrey et al. | Mar. 20, 1956 |

FOREIGN PATENTS

| 4,111 | Great Britain | Mar. 17, 1890 |
| 24,901 | Great Britain | Nov. 11, 1907 |